(12) United States Patent
Matsuoka et al.

(10) Patent No.: US 8,038,127 B2
(45) Date of Patent: Oct. 18, 2011

(54) METHOD FOR MANUFACTURING A HYDROGEN-ADDED WATER AND A DEVICE FOR THE SAME

(75) Inventors: Daigo Matsuoka, Fukuyama (JP);
 Maiko Takebe, Fukuyama (JP);
 Takahiro Hayama, Fukuyama (JP);
 Toshinori Harada, Fukuyama (JP);
 Yuuichi Takagaki, Fukuyama (JP);
 Hisakazu Matsui, Fukuyama (JP)

(73) Assignees: Hiroshima Kasei, Ltd., Tokyo (JP);
 H4O Inc., Tokyo (JP)

( * ) Notice: Subject to any disclaimer, the term of this patent is extended or adjusted under 35 U.S.C. 154(b) by 74 days.

(21) Appl. No.: 12/159,500

(22) PCT Filed: Jul. 6, 2007

(86) PCT No.: PCT/JP2007/063610
§ 371 (c)(1),
(2), (4) Date: Aug. 19, 2008

(87) PCT Pub. No.: WO2009/008046
PCT Pub. Date: Jan. 15, 2009

(65) Prior Publication Data
US 2010/0219260 A1 Sep. 2, 2010

(51) Int. Cl.
 *B01F 3/04* (2006.01)
(52) U.S. Cl. ............ 261/21; 210/150; 210/752; 261/76; 261/94; 261/DIG. 75; 366/336
(58) Field of Classification Search ............ 261/20, 261/21, 76, 94–98, DIG. 75; 366/336; 210/150, 210/151, 749, 752
See application file for complete search history.

(56) References Cited

U.S. PATENT DOCUMENTS

| | | | | |
|---|---|---|---|---|
| 2,017,867 A | * | 10/1935 | Nantz | 222/136 |
| 2,431,455 A | * | 11/1947 | Blanding | 208/157 |

(Continued)

FOREIGN PATENT DOCUMENTS

| | | | | |
|---|---|---|---|---|
| JP | 61-55495 A | * | 3/1986 | 261/DIG. 75 |
| JP | 9-155170 | | 6/1997 | |

(Continued)

OTHER PUBLICATIONS

Patent Abstracts of Japan, English language abstract for Publication No. JP 09-155170, Gas Absorbing Apparatus, published Jun. 17, 1997.

(Continued)

*Primary Examiner* — Richard L Chiesa
(74) *Attorney, Agent, or Firm* — Sterne, Kessler, Goldstein & Fox PLLC

(57) ABSTRACT

The object of the present invention is to provide a method for manufacturing hydrogen-added water containing a large amount of microscopic bubbles and manufacturing equipment for the same so as to expand the industrial applicability of hydrogen-added water by injecting a large amount of microscopic bubbles. More specifically, a plurality of tubular structures, in which the diffusion chamber (5), having double tubes, is provided, and a porous element (6) having predetermined pore diameters, in the diffusion chamber (5) is provided and are substantially linearly arranged in a longitudinal direction. The raw water and hydrogen are supplied with one of the tubular structures, so as to form the mixture of raw water and hydrogen by mixing supplied raw water and hydrogen in the diffusion chamber (5). The mixture is passed through the porous element (6) and diffused therein. The mixture fluid of raw water and hydrogen is then supplied to an adjacent tubular structure under high pressure.

12 Claims, 3 Drawing Sheets

U.S. PATENT DOCUMENTS

| | | | |
|---|---|---|---|
| 3,780,198 A * | 12/1973 | Pahl et al. | 426/477 |
| 3,928,199 A * | 12/1975 | Kirk et al. | 210/758 |
| 4,217,211 A * | 8/1980 | Crane | 210/626 |
| 4,370,304 A * | 1/1983 | Hendriks et al. | 422/224 |
| 4,674,888 A * | 6/1987 | Carlson | 366/337 |
| 5,403,475 A * | 4/1995 | Allen | 210/774 |
| 5,814,210 A * | 9/1998 | Yoon et al. | 209/164 |
| 5,968,352 A * | 10/1999 | Ditzler | 210/220 |
| 2004/0140576 A1 * | 7/2004 | La Crosse | 261/76 |

FOREIGN PATENT DOCUMENTS

| | | |
|---|---|---|
| JP | 2005-13833 | 1/2005 |
| JP | 2005-177724 | 7/2005 |
| JP | 2007-861 | 1/2007 |

OTHER PUBLICATIONS

Patent Abstracts of Japan, English language abstract for Publication No. JP 2005-013833, Reductive Hydrogen Water and Manufacturing Apparatus Therefor, published Jan. 20, 2005.

Patent Abstracts of Japan, English language abstract for Publication No. JP 2005-177724, Apparatus for Producing Hydrogen-Containing Water, published Jul. 7, 2005.

Patent Abstracts of Japan, English language abstract for Publication No. JP 2007-000861, Hydrogen Supersaturated Colloid Simple Treatment Method for Water, and Treatment System Therefor, published Jan. 11, 2007.

* cited by examiner

METHOD FOR MANUFACTURING A HYDROGEN-ADDED WATER AND A DEVICE FOR THE SAME

This application is a national stage of International Application No. PCT/JP2007/063610, filed on Jul. 6, 2007.

BACKGROUND OF THE INVENTION

1. Field of the Invention

The present invention relates to a method for manufacturing a hydrogen-added water and a device for the same, more specifically, relates to the method for continuously manufacturing the hydrogen-added water containing a large amount of microscopic bubbles of the hydrogen gas and the device for the same.

2. Related Art

Various oxidation-reduction systems are present inside of the body of mammals including humans (hereinafter, referred to as "living organisms"), many of which are related to one another and use the oxidation-reduction reaction. The electric potential in the oxidation-reduction systems inside the living organisms is directly related to the free energy changes of the reactions and equilibrium constants, which help to predict the direction of the reactions.

The oxidation-reduction reactions of mammal organs or the reaction inside living organisms have low electric potentials, normally in the range of −100 mV to −400 mV, with a pH in the range of 3 to 7. It is understood that, as the oxidation-reduction potential in bodily fluids increases, active oxygen is easily retained, which causes organ failures. Especially in the intestines, enteric microbes are very active in digesting and absorbing nutrient components, anaerobically reducing ambient oxygen needs to be maintained.

For example, the oxidation-reduction potential of "acetic acid+$CO_2$+$2H^+$/α-ketoglutarate reaction" within the living organism is −673 mV and the oxidation-reduction potential of "acetic acid+$CO_2$/pyruvic acid reaction" is −699 mV. The oxidation-reduction potential of "acetic acid+$2H^+$/acetaldehyde reaction" is −581 mV and the oxidation-reduction potential of ferredoxin is −413 mV. The oxidation-reduction potential of "xanthine+$H^+$/hypoxanthine+$H_2O$" is −371 mV, the oxidation-reduction potential of "uric acid+$H^+$/xanthine+$H_2O$" is −360 mV. The oxidation-reduction potential of acetoacetic acid+$2H^+$/β-hydroxybutyric acid reaction" is −346 mV and the oxidation-reduction potential of "cystine+$2H^+$/2 cysteine reaction" is −340 mV.

Thus, in the reactions of enzymes, coenzyme and metabolically-related substances within the living organism, the oxidation-reduction potential is low. Also, a water or food product having low oxidation-reduction potential has separating and eliminating effects on the active oxygen in the body and on molecules or atoms containing one or more unpaired electrons—i.e. free radicals—thereby enhancing the reaction of the active oxygen excisionase called SOD (superoxide dismutase).

Bodily fluids provide grounds for metabolic reactions inside the body, including oxidation-reduction reactions. Bodily fluids account for substantially 60% of living organisms, to which electrolytes, proteins, and especially water, or the like, are significant components. Water is especially important because reaction in a low oxidation-reduction potential is effective for living organisms.

Meanwhile, the oxidation-reduction potential of a tap water is +400 to +800 mV, with a pH in the range of 6.5 to 8. Consequently, it is believed that tap water does not keep balance with living organisms with an oxidation-reduction potential is in the range of −100 mV to −400 mV.

Current means exist for lowering the oxidation-reduction potential of water (for example, tap water) to less than zero by imposing electrolysis and a high frequency current on the water. However, in all methods thereof, the balance between the oxidation-reduction potential value and the pH is not ideal in terms of the oxidation-reduction reaction within living organisms.

Many other biological reactions accompany the oxidation-reduction reactions and play a pivotal role in metabolic reactions and the like. Also, outside living organisms, in a system (solution) containing an oxidant and a reductant, if an inactive electrode that is uninvolved in the oxidation-reduction reactions itself, such as platinum, is soaked in the solution, a potential difference appears between electrodes. The potential difference is the oxidation-reduction potential (Oxidation-Reduction Potential=ORP), the unit of which is referred to as mV. Herein, if an activity of the oxidant of a substance is [Ox] and that of the reductant thereof is [Red], the state that both are mixed is represented by the formula (1).

$$\text{Formula 1: } [Ox]+n(e) \rightarrow [Red] \qquad (1);$$

wherein e is an electron, and n is an electron number that is moving.

The oxidation-reduction potential (mV) of the electrode reaction formula represented by the formula (1) is expressed by means of the Nernst's formula (2).

$$\text{Formula 2: } E=E_0+(RT/nF)\ln [Ox]/[Red] \qquad (2);$$

wherein R is a gas constant (8.31 $Jmol^{-1}K^{-1}$), T is an absolute temperature (K), and F is a Faraday constant (96406 $JV^{-1}$). $E_0$ is a standard oxidation-reduction potential when [Ox] is equal to [Red].

In the formula (2), ln [Ox]/[Red] is a natural logarithm. Accordingly, as the denominator "[Red]" is becomes much larger than the numerator "[Ox]", the negative value of the oxidation-reduction potential, E, is increased. In other words, theoretically, as the activity of the reductant [Red] is larger than that of the oxidant [Ox], the oxidation-reduction potential can be negatively charged.

More specifically, in the method of negatively changing the oxidation-reduction potential of raw water by blowing hydrogen into raw water in a mixed state of oxidant and reductant, it is important that the activity of the reductant [Red] be larger than that of the oxidant. In this case, efficiency is increased by blowing hydrogen into raw water, which is in the mixed state of oxidant and reductant, the contacting the water with a reduction catalyst like metal supported with the quartz porphyry.

The inventors have hitherto developed hydrogen solution manufacturing equipments based on the above-mentioned theoretical background (see JP 2005-177724). In particular, JP 2005-177724 discloses a hydrogen-added water manufacturing equipment, comprising a reaction tank, a raw water-supplying pipe watertightly connected to the reaction tank, a depressurizing pipe watertightly connected to the reaction tank, a hydrogen-supplying pipe watertightly connected to the reaction tank, and a water-extracting pipe watertightly connected to the reaction tank.

Recently, studies on microscopic bubbles and developments in application thereof have been well-practiced. Microscopic bubbles are defined as fine bubbles having diameters in the range of 10 to a few dozen μm. In general, the bubbles generated or formed in water are a few millimeters in diameter, but microscopic bubbles are characterized as having a hundredth thereof in diameter. In such formations, the microscopic bubbles have the high absorption efficiencies into bodily fluids, and are superior in homogeneity and dispersibility. Microscopic bubbles also increase biological activities of living organisms. Applications to diagnosis and treatment of cancer take advantage of the characteristic that the microscopic bubbles can produce heat up to about 70 degrees when they are exposed to ultrasound waves.

SUMMARY OF THE INVENTION

The present invention relates to a method for manufacturing a hydrogen-added water and a device for the same so as to solve the above-mentioned problems in the prior art. An object of the present invention is to provide the method for manufacturing hydrogen-added water containing a large amount of microscopic bubbles and the device for the same, by adding the hydrogen-added water disclosed in JP 2005-177724 to a large amount of microscopic bubbles so as to improve industrial applications of the hydrogen-added water.

The hydrogen-added water of the present invention contains a large amount of hydrogen, the oxidation-reduction potential of which is kept below −400 mV and the pH of which is kept slightly higher than 7. The hydrogen-added water contains a large amount of the hydrogen gas as the microscopic bubbles having the diameter in the broad range of milli-bubble, micro-bubble and micronano-bubble.

Herein, according to the microscopic bubbles, the diameters of the bubbles during the development period are sometimes classified as milli-bubble, micro-bubble, micronano-bubble and nano-bubble. A diameter in the millimeter range is classified as a milli-bubble. A diameter in the range of 10 to few dozen micrometers is classified as a micro-bubble. A diameter in the range of several hundred nanometers to 10 micrometers is classified as micronano-bubble. A diameter in the range of less than several hundred nanometers is classified as a nano-bubble. In the present invention, these classifications are adopted. More specifically, in the development period, the hydrogen-added water of the present invention is characterized by using bubbles of hydrogen gas having diameters in the broad range from the milli-bubble, that is below 0.12 mm in diameter, to the micro-bubble and the micronano-bubble diameters.

The inventors studied the following problems: (1) assuredly blowing a predetermined amount of the hydrogen gas into the raw water, (2) making the hydrogen gas added to raw water microscopic bubbles having prescribed diameters, (3) not batch-wisely but continuously manufacturing the hydrogen-added water and (4) requiring no broad installation space, occasionally having mobility like showers and being easy to operate.

Consequently, the manufacturing equipment according to the present invention has a tubular structure, a cross section of which is mainly circularly or rectangular formed. The material of the tubular structure is preferably metal such as carbon steel, stainless steel, or the like, but it may be glass, plastic, ceramic, rubber, or combinations thereof having the strength to endure negative pressure.

An aperture is formed as an injection tip for water on one end of the equipment, to which a raw water supply is watertightly connected to supply raw water under high pressure. The raw water supply is connected to the water-supplying equipment of which a water pressure is 0.1 to 0.5 MPa, usually to the tap water, and a pump is connected in between. The supply of the raw water is preferably 8 to 20 L/min.

A nozzle is formed on the inner side of the tubular structure in the injection tip of the water provided on the other end of the equipment so as to inject the water under high pressure at a higher pressure. As the raw water is usually injected in an incompressibility condition, i.e. below at sonic speed, the configuration of the nozzle may be a so-called tapered nozzle so that a flow passage area is smoothly appropriately small. Preferably, when the raw water is injected in a compressible condition, i.e. above sonic speed, the flow passage area must be broadened again, so that the nozzle combining the tapered and divergent nozzles is used.

The hydrogen-supplying system is watertightly provided in the equipment. The system supplies the hydrogen substantially at a right angle toward the raw water supplied from the raw water-supplying system. Probably, a check valve is provided in the hydrogen-supplying system, thereby preventing the water supplied from the raw water-supplying system from flowing backward to the hydrogen-supplying system. A hydrogen cylinder, a gas pressure controlling device and a piping or the like are incorporated in the hydrogen-supplying system, thereby injecting the hydrogen gas to which the pressure is adjusted.

Preferably, the supply pressure of the hydrogen gas is 0.2 to 08 MPa and the supply thereof is 0.1~1 L/min.

In the tubular structure, a diffusion chamber is formed by so called double tubes in a longitudinal direction of the equipment, downstream of the hydrogen-supplying system, said diffusion chamber spreads a mixture of raw water, supplied by the raw water supply, to the tubular structure where hydrogen is supplied from the hydrogen-supplying system.

The diffusion chamber is formed so as to taper at both ends toward the center, i.e. to narrow down, so that negative pressure is generated at the narrowed portion. Thus, the suction effect of the mixed fluid made of raw water supplied from the raw water supply to the tubular structure and hydrogen supplied from the hydrogen-supplying system to the tubular structure is increased, because the diffusion chamber is formed so as to narrow down, so that negative pressure is generated.

A porous element having predetermined pore diameters is filled within the diffusion chamber. The porous element provided with the diffusion chamber is a filter of a sort. Bubbles having the same diameters as the pores, formed in the porous element, can be produced by injecting the mixture fluid consisting of raw water and hydrogen, introduced into the diffusion chamber, through the porous element.

The porous element has pores with diameters in the range of 120 µm to 2 µm. The material of the porous element is not particularly limited and, for example, may be a sintered body such as gunmetal, bronze, nickel, stainless steel, ceramic, metallic mesh, or the like. A sintered body such as stainless steel is preferable due to the abrasion-resistance when the produced hydrogen-added water is supplied for drinking.

The shape of the porous element includes a wide variety of shape such as a disk-shaped, a cylindrical shape, with a cylindrical bottom, with a base or the like. The cylindrical shape is preferable to insert it into the equipment.

The thickness of the porous element is 5 to 20 mm, preferably 5 to 10 mm, but is can be selected in accordance with the conditions such as the water pressure and water dosage or the like.

In general, the pore diameter (by Tyler standard) of the porous element is in the range of 20 to 250 meshes (0.833 mm to 0.061 mm). The porous element, having a more than 120 meshes across its diameter is selected so as to form the microscopic bubbles less than 10 µm in diameter. If the pore diameter is larger (as the value of mm is smaller), highly-concentrated dissolved hydrogen content can be acquired, thereby increasing the pressure drop and decreasing the production efficiency. Accordingly, the pore diameter of the porous element is can be selected, depending on the required dissolved hydrogen content and the water dosage.

More than one tubular structure is connected and used in the manufacturing equipment of the hydrogen-added water according to the present invention. More than 1.3 ppm of the dissolved hydrogen content with water dosage of more than 15 L/min. can be ensured by connecting and using more than one tubular structures.

In light of the above construction, the first embodiment of the present invention is a method for manufacturing a hydrogen-added water;

said method, wherein a diffusion chamber, having double tubes is provided and a plurality of tubular structures, in which porous element having predetermined pore diameters in the diffusion chamber, is provided, are substantially linearly arranged in a longitudinal direction and a raw water and the hydrogen are supplied with one of the tubular structures, so as to form the mixture fluid of the raw water and the hydrogen by mixing the supplied raw water and hydrogen in the diffusion chamber, the mixture fluid is passed through the porous element and diffused therein, the mixture fluid of raw water and hydrogen passed through the porous elements is supplied with the adjacent tubular structure under high pressure, so as to mix it with the hydrogen in the diffusion chamber of the adjacent tubular structure as well as to pass it through the porous element and diffuse therein, so that the hydrogen-added water containing a large amount of microscopic bubbles of hydrogen gas can be continuously produced.

The diameters of the microscopic bubbles may be in the range of 120 μm to 2 μm. The pore diameter of the porous element may be in the range of 120 μm to 2 μm. The porous element may be a sintered body of metal or ceramic.

The second embodiment of the present invention is manufacturing equipment for hydrogen-added water, comprising a tubular structure, both ends of which are formed in an open state, a raw water-supplying system that is formed on one end of the tubular structure and supplies raw water under high pressure, a hydrogen supplying system that is watertightly connected to the tubular structure and supplies hydrogen substantially at a right angle toward the raw water supplied from the raw water-supplying system, a diffusion chamber that is formed in a longitudinal direction of the tubular structure downstream from the hydrogen supplying system in the tubular structure so as to diffuse a mixture fluid of raw water supplied from the raw water supply to the tubular structure and the hydrogen supplied from the hydrogen supplying system to the tubular structure, a porous element having a predetermined pore diameter, which fills the diffusion chamber so as to pass through the mixture fluid of the supplied raw water and hydrogen, and an outlet that is formed on the other end of the tubular structure so as to discharge mixture fluid of raw water and hydrogen passed through the porous element, wherein a plurality of the tubular structures connect the adjacent raw water-supplying system to the outlet and is substantially linearly arranged in a longitudinal direction and the mixture fluid of raw water and hydrogen discharged from one of the tubular structures is supplied from the adjacent raw water supply of the tubular system to the tubular structure under high pressure and mixed with hydrogen in the adjacent diffusion chamber of the tubular structure so as to pass through the porous element and diffuse, so that the hydrogen-added water, containing a large amount of microscopic bubbles of the hydrogen gas, is continuously produced.

The diameters of the microscopic bubbles may be in the range of 120 μm to 2 μm. The pore diameters of the porous element may be in the range of 120 μm to 2 μm. The porous element may be a sintered body of metal or ceramic. A supply pressure of raw water may be 0.1 to 0.5 MPa. A supply of raw water may be 8 to 20 L/min. The supply pressure of hydrogen may be 0.2 to 0.8 MPa. A supply of hydrogen may be 0.1 to 1 L/min.

According to the first embodiment of the present invention, the hydrogen-added water, containing a large amount of hydrogen gas as bubbles, is commercially available for drinking with packaging in the predetermined container. Because hydrogen-added water contains a large amount of hydrogen gas as bubbles, it has high absorption efficiency into living organisms and is superior, thereby applying it to the depuration of the water as well as the diagnosis and treatment of cancer or the like by using the performance of improving the biological activity of the living organism. The hydrogen-added water containing hydrogen gas as bubbles can be continuously produced by maintaining the oxidation-reduction potential in the prescribed range and by keeping the pH neutral.

Also, the diameters of the microscopic bubbles in the hydrogen gas are in the range of 120 μm to 2 μm, thereby increasing the application potentiality of the produced hydrogen-added water to the depuration of the water as well as to the diagnosis and treatment of cancer or the like.

Diameters of microscopic bubbles in the porous element are in the range of 120 μm to 2 μm, thereby easily adjusting the diameters of the microscopic bubbles to the range of 120 μm to 2 μm.

The porous element is made up of the sintered body such as metal or ceramic, thereby improving durability and reliability of the pores in the porous element.

According to the second embodiment of the present invention, the hydrogen-added water, containing a large amount of hydrogen gas as bubbles is commercially available for drinking with packaging in a predetermined container. Because hydrogen-added water contains a large amount of hydrogen gas as bubbles, it has high absorption efficiency into living organisms and is superior, thereby applying it to the depuration of the water as well as to the diagnosis and treatment of cancer or the like by using the performance of improving the biological activity of living organisms. The hydrogen-added water containing hydrogen gas as bubbles can be continuously produced by maintaining the oxidation-reduction potential in the prescribed range and by keeping the pH in neutral. The miniaturization and simplification of the equipment can expand its applications.

Also, the diameters of the microscopic bubbles in the hydrogen gas are in the range of 120 μm to 2 μm, thereby increasing the application potentiality of the produced hydrogen-added water to the depuration of the water as well as to the diagnosis and treatment of cancer or the like.

The diameters of the microscopic bubbles in the porous element are in the range of 120 μm to 2 μm, thereby easily adjusting the diameters of the desired microscopic bubbles of hydrogen in the range of 120 μm to 2 μm.

The porous element is made up of a sintered body such as metal or ceramic, thereby improving durability and reliability of the pores in the porous element.

Because the supply pressure of raw water is 0.1 to 0.5 and supply of the raw water is 8 to 20 L/min., ordinary tap water (indifferent water) can be used as the raw water, thereby extending the range of use.

The supply pressure of raw water is 0.2 to 0.8 MPa and the supply of raw water is 0.1 to 1 L/min., thereby easily containing 0.5 to 1.6 ppm of hydrogen.

DETAILED DESCRIPTION OF THE INVENTION

Hereinafter, preferred embodiments of the present invention will be described.

EXAMPLE 1

Figure 1:
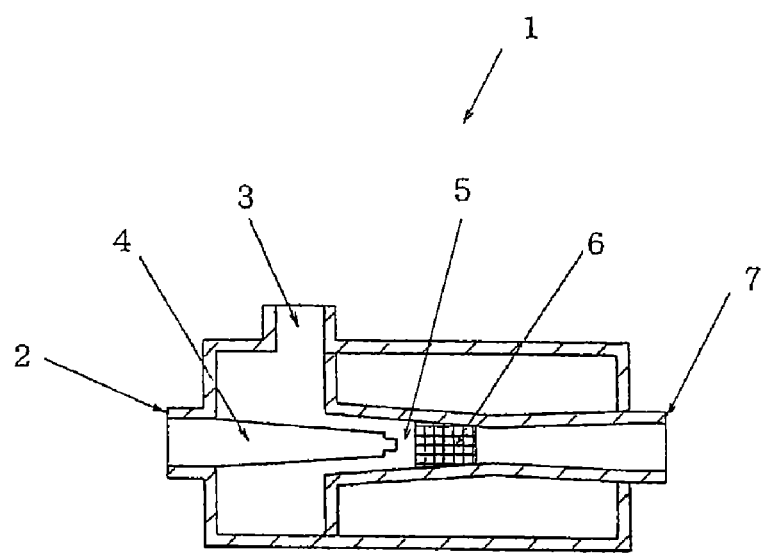
FIG. 1 is a cross-sectional view of the produced hydrogen-added water manufacturing equipment according to one embodiment of the present invention.

FIG. 1 is a cross-sectional view of the produced hydrogen-added water manufacturing equipment according to one embodiment of the present invention. Referred to FIG. 1, a hydrogen-added water manufacturing equipment 1 is composed of the tubular structure made from stainless steel and raw water-supplying port 2 is provided as a raw water supply. The raw water-supplying port 2 is watertightly connected to a tap water-supplying port, a pump, and piping or the like (not shown). A hydrogen supplying port 3 is provided as a hydrogen supplying system in the hydrogen-added water manufacturing equipment 1. The hydrogen supplying port 3 is watertightly connected to a hydrogen cylinder, a gas pressure controlling device, and piping or the like (not shown). The hydrogen supplying port 3 is configured so that the hydrogen is injected substantially at a right angle toward the raw water. A tapered nozzle 4 is connected to the apex of the raw water-supplying port 2, so that the raw water is injected under high pressure.

A diffusion chamber 5 having a double-tube construction is formed in the hydrogen-added water manufacturing equipment 1. The diffusion chamber 5 is formed so as to taper from both ends toward the center—i.e. to narrow down—so that the negative pressure is generated at the narrowed portion. An outlet 7, so as to discharge the produced hydrogen-added water, is formed on the apex of the downstream portion of the diffusion chamber 5.

A porous element 6 is placed in the tapered portion of the diffusion chamber 5. For example, as mentioned below, a sintered body of stainless steel having a thickness of 10 mm and a pore diameter of 200 meshes (0.074 mm) is used as the porous element 6.

Next, a method for manufacturing hydrogen-added water using the hydrogen-added water manufacturing equipment 1 will be described.

In the present embodiment, first, tap water (oxidation-reduction potential=357 mV, pH=7.25, dissolved hydrogen content=3 ppb and water temperature=13.2 degrees), in the waterworks department of Fukuyama City, Hiroshima Prefecture, was injected from the raw water-supplying port 2 at a water pressure of 0.2 MPa, in a water dosage of 15 L/min. The hydrogen gas was injected from the hydrogen supplying port 3 at the gas pressure of 0.25 MPa using the gas pressure controlling device, with water usage of 0.5 L/min, so as to form the mixture fluid of the raw water and the hydrogen.

The mixture fluid was diffused in the diffusion chamber 5 through the porous element 6. Consequently, the hydrogen-added water, containing a large amount of microscopic bubbles with 200 meshes (0.074 mm), in the water usage of 10 L/min., at the water temperature of 13.3 degrees, in the dissolved hydrogen content of 1.31 ppm, at the oxidation-reduction potential=−615 mV and pH=7.35, can be continuously obtained from the outlet 7.

EXAMPLE 2

In the second embodiment, the same equipment as the hydrogen-added water manufacturing equipment 1 used in the first embodiment was used, except for changing the thickness of the porous element 6 to 5 mm.

Tap water (oxidation-reduction potential=357 mV, pH=7.25, the dissolved hydrogen content=3 ppb and a water temperature=13.2 degrees) in the waterworks department of Fukuyama City, Hiroshima Prefecture was injected from the raw water-supplying port 2 at a water pressure of 0.2 MPa, with a water usage of 15 L/min. The hydrogen gas was injected from the hydrogen supplying port 3 at the gas pressure of 0.25 MPa 2 MPa using the gas pressure controlling device, in the water usage of 0.5 L/min, so as to form the mixture fluid of the raw water and the hydrogen. The mixture fluid was diffused in the diffusion chamber 5 through the porous element 6. Consequently, the hydrogen-added water, containing a large amount of microscopic bubbles with 200 meshes (0.074 mm), with a water usage of 12 L/min., at a water temperature of 13.3 degrees, in dissolved hydrogen content of 0.9 ppm, at oxidation-reduction potential=−600 mV and pH=7.30, can be continuously obtained from the outlet 7.

EXAMPLE 3

In the third embodiment, the same equipment as the hydrogen added-water manufacturing equipment 1 used in the first embodiment was used, except for changing the thickness of the porous element 6 to 10 mm and changing the pore diameter to 60 meshes (0.246 mm).

Tap water (the oxidation-reduction potential=357 mV, pH=7.25, the dissolved hydrogen content=3 ppb and a water temperature=13.2 degrees) in the waterworks department of Fukuyama City, Hiroshima Prefecture was injected from the raw water-supplying port 2 at a water pressure of 0.2 MPa, with a water usage of 15 L/min. The hydrogen gas was injected from the hydrogen supplying port 3 at a gas pressure of 0.25 MPa using a gas pressure controlling device, with a water usage of 0.5 L/min so as to form the mixture fluid of raw water and hydrogen. The mixture fluid was diffused in the diffusion chamber 5 through the porous element 6. Consequently, hydrogen-added water, containing a large amount of microscopic bubbles, with 60 meshes (0.246 mm), a water usage of 12 L/min., a water temperature of 13.3 degrees, a dissolved hydrogen content of 0.92 ppm, at the oxidation-reduction potential=−600 mV and pH=7.31 can be continuously obtained from the outlet 7.

EXAMPLE 4

In the fourth embodiment, the same equipment as the hydrogen-added water manufacturing equipment 1 used in the first embodiment was used, except for changing the thickness of the porous element 6 to 5 mm and changing the pore diameter to 60 meshes (0.246 mm).

Tap water (the oxidation-reduction potential=357 mV, pH=7.25, the dissolved hydrogen content=3 ppb and a water temperature=13.2 degrees) in the waterworks department of Fukuyama City, Hiroshima Prefecture was injected from the raw water-supplying port 2 at a water pressure of 0.2 MPa, with a water usage of 15 L/min. The hydrogen gas was injected from the hydrogen supplying port 3 at a gas pressure of 0.25 MPa using a gas pressure controlling device, and a water usage of 0.5 L/min so as to form the mixture fluid of raw water and hydrogen. The mixture fluid was diffused in the diffusion chamber 5 through the porous element 6. Consequently, hydrogen-added water, containing a large amount of microscopic bubbles having 60 meshes (0.246 mm), a water usage of 14 L/min., at the water temperature of 13.3 degrees, in the dissolved hydrogen content of 0.75 ppm, at the oxidation-reduction potential=−600 mV and pH=7.28 can be continuously obtained from the outlet 7.

EXAMPLE 5

Figure 2:
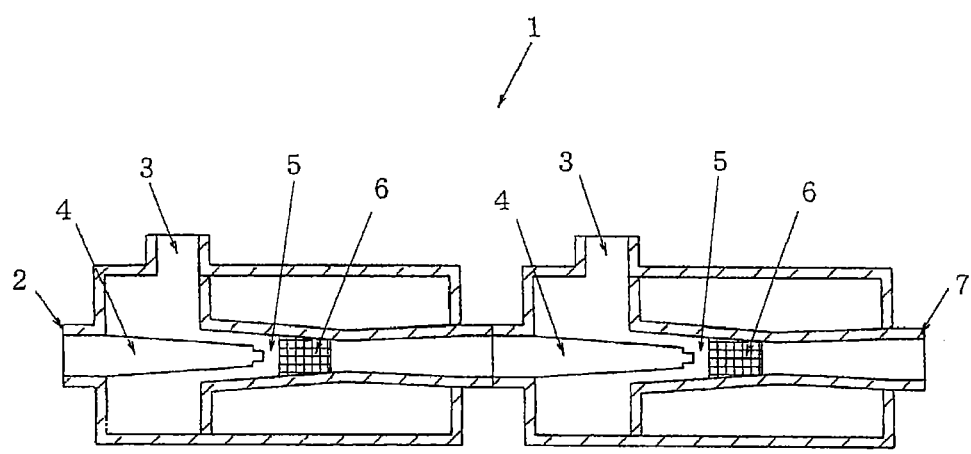
FIG. 2 is a cross-sectional view of the produced hydrogen-added water manufacturing equipment according to another embodiment of the present invention.

FIG. 2 is a cross-sectional view of the equipment according to the fifth embodiment of the present invention. The equipment used in the fifth embodiment includes the structure, to which two of the hydrogen-added water manufacturing components 1 of the first embodiment, equipped with the porous element 6 having the thickness of 10 mm and the pore diameter of 200 meshes (0.074 mm), are connected.

More specifically, two of the tubular structures, which connect the adjacent hydrogen supplying port 3 and outlet 7, are substantially linearly arranged in a longitudinal direction. The mixture fluid of raw water and hydrogen discharged from one outlet 7 is supplied from the adjacent hydrogen supplying port 3 to the tubular structure under high pressure, and is continuously mixed with hydrogen in the adjacent diffusion chamber 5 of the tubular structure.

Tap water (the oxidation-reduction potential=357 mV, pH=7.25, the dissolved hydrogen content=3 ppb and water temperature=13.2 degrees) in the waterworks department of Fukuyama City, Hiroshima Prefecture was injected from the raw water-supplying port 2 at a water pressure of 0.2 MPa, with a water usage of 20 L/min. Hydrogen gas was injected from two of the hydrogen supplying ports 3, 3 at a gas pressure of 0.25 MPa using a gas pressure controlling device, in the water usage of 0.5 L/min. so as to form the mixture fluid of raw water and hydrogen. The mixture fluid was diffused in two of the diffusion chambers 5, 5 through two of the porous elements 6, 6. Consequently, the hydrogen-added water, containing a large amount of microscopic bubbles with 200 meshes (0.074 mm), with a water usage of 15 L/min., at a water temperature of 13.3 degrees, in a dissolved hydrogen content of 1.7 ppm, at the oxidation-reduction potential=−625 mV and pH=7.31 can be continuously obtained from the outlet 7.

EXAMPLE 6

Figure 3:
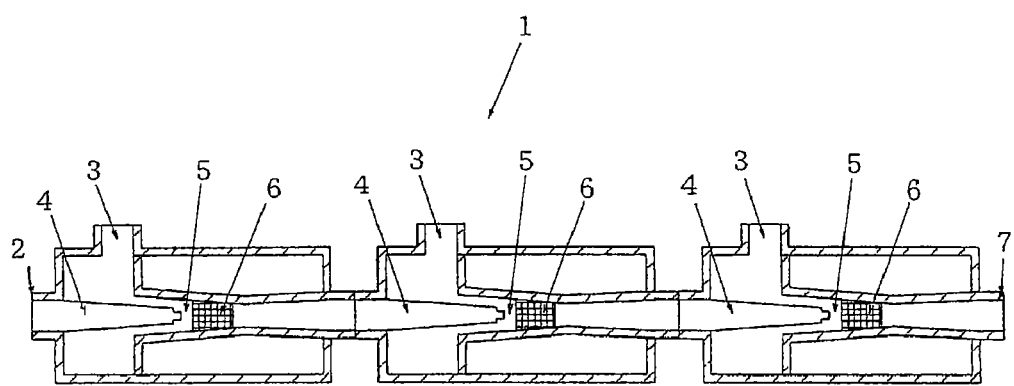
FIG. 3 is a cross-sectional view of the produced hydrogen-added water manufacturing equipment according to yet another embodiment of the present invention.

FIG. 3 is a cross-sectional view of the equipment according to the sixth embodiment. The equipment used in the sixth embodiment includes the structure to which three of the hydrogen-added water manufacturing components 1 of the first embodiment, equipped with the porous element 6 having the thickness of 10 mm and the pore diameter of 60 meshes (0.246 mm).

Tap water (the oxidation-reduction potential=357 mV, pH=7.25, the dissolved hydrogen content=3 ppb and a water temperature=13.2 degrees) in the waterworks department of Fukuyama City, Hiroshima Prefecture was injected from the raw water-supplying port 2 at a water pressure of 0.25 MPa, in a water usage of 0.5 L/min. Hydrogen gas was injected from three of the hydrogen supplying ports 3, 3 and 3 at a gas pressure of 0.25 MPa, with a water usage of 0.5 L/min, so as to form a mixture fluid of raw water and hydrogen. The mixture fluid was diffused in three of the diffusion chambers 5, 5 and 5 through three of the porous elements 6, 6 and 6. Consequently, hydrogen-added water, containing a large amount of microscopic bubbles with 60 meshes (0.246 mm), with a water usage of 15 L/min., in a dissolved hydrogen content of 1.52 ppm, at an oxidation-reduction potential=−623 mV and pH=7.31 can be continuously obtained from the outlet 7.

INDUSTRIAL APPLICABILITY

The present invention can apply hydrogen-added water, containing a large amount of microscopic bubbles of hydrogen gas, which is produced by the method for manufacturing hydrogen-added water and the manufacturing equipment for the same, not only to drinking water, but also to depuration of the water quality and diagnosis/treatment, or the like.

The invention claimed is:
1. A method for manufacturing a hydrogen-added water rich in microscopic bubbles of hydrogen gas comprising the steps of:
supplying raw water and hydrogen to one of tubular structures, wherein the tubular structures are substantially linearly arranged in a longitudinal direction, wherein the tubular structure is a diffusion chamber of double tubes structure and a porous element having predetermined pore diameters in the diffusion chamber;
mixing the supplied raw water and hydrogen in the diffusion chamber to make the mixture fluid of the raw water and the hydrogen;
passing the mixture fluid through the porous element and diffusing the mixture fluid;
providing the mixture fluid of the raw water and hydrogen passed through the porous elements to an adjacent tubular structure under high pressure; and
passing the mixture fluid through the porous element and diffusing the mixture fluid after mixing the mixture fluid with hydrogen in the diffusion chamber of the adjacent tubular structure.
2. The method for manufacturing the hydrogen-added water as set forth in claim 1, wherein the diameters of the microscopic bubbles are in the range of 120 μm to 2 μm.
3. The method for manufacturing the hydrogen-added water as set forth in claim 1, wherein the pore diameters of the porous element are in the range of 120 μm to 2 μm.
4. The method for manufacturing the hydrogen-added water as set forth in claim 1, wherein the porous element is a sintered body of a metal or ceramics.
5. A manufacturing equipment for a hydrogen-added water, comprising;
a tubular structure, both ends of which are formed in an open state,
a raw water-supplying system that is formed on one end of the tubular structure and supplies the raw water under high pressure,
a hydrogen supplying system that is watertightly connected to the tubular structure and supplies the hydrogen substantially at a right angle toward the raw water supplied from the raw water-supplying system,
a diffusion chamber that is formed in a longitudinal direction of the tubular structure downstream of the hydrogen supplying system in the tubular structure so as to diffuse a mixture fluid of the raw water supplied from the raw water-supplying system to the tubular structure and the hydrogen supplied from the hydrogen supplying system to the tubular structure, a porous element having a predetermined pore diameter, which is filled within the diffusion chamber so as to pass through the mixture fluid of the supplied raw water and hydrogen, an outlet that is formed on the other end of the tubular structure so as to discharge mixture fluid of the raw water and the hydrogen passed through the porous element, wherein a plurality of the tubular structures connects the adjacent raw water-supplying system to the outlet and is substantially linearly arranged in a longitudinal direction and the mixture fluid of the raw water and the hydrogen discharged from one of the tubular structure is supplied from the adjacent raw water-supplying system of the tubular structure to the tubular structure under high pressure and mixed with the hydrogen in the adjacent diffusion chamber of the tubular structure so as to pass through the porous element and diffuse, so that the hydrogen-added water containing a large amount of microscopic bubble of the hydrogen gas is continuously produced.

6. The manufacturing equipment for a hydrogen-added water as set forth in claim 5, wherein the diameters of the microscopic bubbles is in the range of 120 μm to 2 μm.

7. The manufacturing equipment for a hydrogen-added water as set forth in claim 5, wherein the pore diameters of the porous element are in the range of 120 μm to 2 μm.

8. The manufacturing equipment for a hydrogen-added water as set forth in claim 5, wherein the porous element is a sintered body of a metal or ceramics.

9. The manufacturing equipment for a hydrogen-added water as set forth in claim 5, wherein a supply pressure of the raw water is 0.1 to 0.5 MPa.

10. The manufacturing equipment for a hydrogen-added water as set forth in claim 5 wherein a supply of the raw water is 8 to 20 L/min.

11. The manufacturing equipment for a hydrogen-added water as set forth in claim 5 wherein a supply pressure of the hydrogen is 0.2 to 0.8 MPa.

12. The manufacturing equipment for a hydrogen-added water as set forth in claim 5, wherein a supply of the hydrogen is 0.1 to 1 L/min.

* * * * *